United States Patent
Riegelsberger et al.

(10) Patent No.: US 9,902,225 B2
(45) Date of Patent: Feb. 27, 2018

(54) COVER FOR A CHASSIS CONTROL ARM

(71) Applicant: AUDI AG, Ingolstadt (DE)

(72) Inventors: Wolfgang Riegelsberger, Kösching (DE); Matthias Fuchs, Gaimersheim (DE); Hans-Jürgen Langhoff, Lenting (DE); Bastian Bösl, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 19 days.

(21) Appl. No.: 15/124,237

(22) PCT Filed: Feb. 6, 2015

(86) PCT No.: PCT/EP2015/000247
§ 371 (c)(1),
(2) Date: Sep. 7, 2016

(87) PCT Pub. No.: WO2015/135617
PCT Pub. Date: Sep. 17, 2015

(65) Prior Publication Data
US 2017/0015169 A1   Jan. 19, 2017

(30) Foreign Application Priority Data
Mar. 8, 2014   (DE) .......................... 10 2014 003 305

(51) Int. Cl.
*B60G 7/00* (2006.01)
*B62D 35/02* (2006.01)

(52) U.S. Cl.
CPC ............. *B60G 7/001* (2013.01); *B62D 35/02* (2013.01); *B60G 2204/41* (2013.01);
(Continued)

(58) Field of Classification Search
CPC ................ B60G 7/001; B60G 2206/71; B60G 2206/016; B60G 2206/7102;
(Continued)

(56) References Cited

U.S. PATENT DOCUMENTS

| 4,509,774 A | * | 4/1985 | Booher .................. B29C 70/52 267/47 |
| 5,954,405 A |   | 9/1999 | Toman |

(Continued)

FOREIGN PATENT DOCUMENTS

| CN | 101353004 | 1/2009 |
| DE | 10 2007 046 150 A1 | 4/2009 |

(Continued)

OTHER PUBLICATIONS

International Search Report issued by the European Patent Office in International Application PCT/EP2015/000247.
(Continued)

*Primary Examiner* — Darlene P Condra
(74) *Attorney, Agent, or Firm* — Henry M. Feiereisen LLC

(57) ABSTRACT

A cover is disclosed for a chassis control arm which includes at least one bearing mount for a control arm bearing. The cover is formed separately from the chassis control arm and covers in the installed state at least part of the underside of the chassis control arm. Arranged on the cover is an extension which is intended as buffer and extends from the cover in the direction of the control arm bearing.

14 Claims, 2 Drawing Sheets

(52) U.S. Cl.
CPC ............... *B60G 2204/4308* (2013.01); *B60G 2206/016* (2013.01); *B60G 2206/10* (2013.01); *B60G 2206/71* (2013.01); *B60G 2206/7102* (2013.01); *B60G 2206/7104* (2013.01); *B60G 2206/73* (2013.01)

(58) Field of Classification Search
CPC ........ B60G 2206/7104; B60G 2206/73; B60G 2206/10; B60G 2204/4308; B60G 2204/41; B62D 35/02
See application file for complete search history.

(56) References Cited

U.S. PATENT DOCUMENTS

| | | | |
|---|---|---|---|
| 8,500,149 B1* | 8/2013 | Nazarian, Jr. ............ | B60G 3/06 277/635 |
| 8,646,787 B2 | 2/2014 | Langhoff | |
| 8,905,437 B2* | 12/2014 | Tsuchiya ................ | B62D 21/02 280/124.106 |
| 9,227,475 B2* | 1/2016 | Ottinger ................. | B60G 7/001 |
| 9,393,851 B2 | 7/2016 | Mohrlock et al. | |
| 9,399,378 B2 | 7/2016 | Goldberg et al. | |
| 9,415,650 B2* | 8/2016 | Bromme ............... | F16D 65/128 |
| 2007/0096420 A1 | 5/2007 | Lounsberry et al. | |
| 2011/0309652 A1 | 12/2011 | Eichentopf et al. | |
| 2013/0228994 A1* | 9/2013 | Davy ..................... | B60G 3/207 280/124.128 |
| 2014/0001725 A1* | 1/2014 | Matsumoto ........... | B60G 7/001 280/124.134 |

FOREIGN PATENT DOCUMENTS

| | | |
|---|---|---|
| EP | 2 476 565 A1 | 7/2012 |
| FR | 2 966 102 A1 | 4/2012 |
| JP | 2004-114789 A | 4/2004 |
| JP | 2006-56463 | 3/2006 |
| JP | 2009-196557 A | 9/2009 |
| JP | 2011-162095 A | 8/2011 |
| JP | 2012-116252 A | 6/2012 |
| WO | WO 2010/136460 A1 | 12/2010 |
| WO | WO 2013/083896 A1 | 6/2013 |

OTHER PUBLICATIONS

Chinese Search Report dated May 25, 2017 with respect to counterpart Chinese patent application 2015800124435.
Translation of Chinese Search Report dated May 25, 2017 with respect to counterpart Chinese patent application 2016800124435.

* cited by examiner

COVER FOR A CHASSIS CONTROL ARM

CROSS-REFERENCES TO RELATED APPLICATIONS

This application is the U.S. National Stage of International Application No. PCT/EP2015/000247, filed Feb. 6, 2015, which designated the United States and has been published as International Publication No. WO 2015/135617 and which claims the priority of German Patent Application, Serial No. 102014003305.8, filed Mar. 8, 2014, pursuant to 35 U.S.C. 119(a)-(d).

BACKGROUND OF THE INVENTION

The present invention relates to a cover for a chassis control arm which includes at least one bearing mount for a control arm bearing, with the cover, which is formed separately from the chassis control arm, covering in the installed state at least part of the underside of the chassis control arm, and to a motor vehicle with at least one chassis control arm upon which such a cover is arranged.

Such covers are arranged in vehicle construction on chassis control arms, also called wishbone or simply control arm, in order to achieve, inter alia, a better flow around the underbody in the region of the wheel suspension and to ensure a protection against impact from rocks. The wheel suspension connects the wheel to the body and guides it in certain degrees of freedom. Chassis control arms can be made from formed (steel) sheets or (formed) extruded profiles, for example an extruded aluminum profile. The chassis control arm has terminal bearing mounts for placement of a control arm bearing, preferably designed as a rubber-metal bearing. Depending on the embodiment, the bearing mounts can be formed from two concentric bores in two parallel side webs of the chassis control arm or from a guide sleeve into which the control arm bearing, constructed as rubber-metal sleeve bearing, is press-fitted, and which are welded thereto depending on the design of the chassis control arm, or held in one or more bores in the side webs of the chassis control arm, or formed integrally from the material of the chassis control arm by using a forming process. Depending on the geometry of the control arm, the wheel-side control arm mount may represent the lowest lying point in the installed state. When driving over obstacles, there is a risk that the bearing mount hits the ground and as a result the bearing mount and/or the control arm bearing becomes damaged.

EP 2435288 A1 shows a cover on a wheel guide element of a rear axle of a motor vehicle, which wheel guide element extends substantially transverse to the travel direction, with the cover substantially extending horizontally in its installed position on the motor vehicle and being divided into a section anteriorly of the rear axle and a section behind the rear axle, with both sections extending at different angles in relation to a horizontal plane and directed upwards, starting from its transition region.

EP 2476565 A1 describes an air deflecting cover mountable to a wheel suspension device of a vehicle for straightening an air flow beneath the vehicle, with the air deflecting cover including an inner cover section mountable to a wheel suspension element of the wheel suspension device and extending in a width direction of the vehicle. The inner cover section has a vertical flow straightening surface which extends in a longitudinal direction of the vehicle and faces towards a widthwise center portion of the vehicle. The air deflecting cover further includes a lower cover section which is mountable to a bottom part of the wheel suspension element and has a flow straightening surface which points downwards from the vehicle. The inner cover section and the lower cover section are integrally formed with each other, with the lower cover section being a bottom plate element which is located below an end of the wheel suspension element, and with the inner cover section being an inner plate element. The inner plate element extends hereby upwardly from an inner edge of the bottom plate element, which is directed in the direction of the central region with respect to the width direction of the vehicle.

The mentioned documents do not provide additional protection for a bearing mount of the chassis control arm, so that it can be expected that traveling over obstacles has an adverse effect on the sensitive bearing mount.

DE 10 2007 046 150 A1 discloses a device for protecting components of a vehicle underside of a truck with at least one protective element, on which the truck is supported in an emergency, with the protective element being formed as part of a component (bearing shell) of an axle suspension of a vehicle axle of the truck. However, this protection element is not suitable as cover of the type involved here for a chassis control arm.

SUMMARY OF THE INVENTION

Object of the present invention is therefore to provide a cover for a chassis control arm which better protects in particular the bearing mount of the chassis control arm against damage.

According to one aspect of the invention, the object is attained by a cover for a chassis control arm which has at least one bearing mount for a control arm bearing, with the cover being formed seperately from the chassis control arm and covering in the installed state at least part of the underside of the chassis control arm and with the cover having arranged thereon an extension that provides a buffer and extends from the cover in the direction of the control arm bearing.

By arranging on the cover, which preferably is designed as air guiding device, an extension intended as (stop) buffer and extending in the direction of the control arm bearing, provision is made for an additional protective structure between a potentially encountered obstacle and the control arm bearing. This reduces the risk of damage to both the bearing mount and the control arm bearing itself. By extending the extension in the direction of the control arm bearing, the bearing mount receiving the control arm bearing is inevitably protected as well.

In a preferred embodiment, the extension can be deformed when subjected to an external force. A deformability of the extension improves protection in the event of an impact of a solid body, since the extension dissipates energy which is only partially transmitted to the control arm bearing and the bearing mount.

In a preferred embodiment, the extension has a rib-like structure. The rib-like structure is comparably light and exhibit advantageous deformation characteristics due to the presence of the ribs.

In a preferred embodiment, the spatial shape of the extension is suited to the outer contour of the control arm bearing. As a result, any force applied to the control arm bearing can be influenced in a targeted manner. In a particularly preferred embodiment, the extension rests partly upon the control arm bearing.

In a preferred embodiment, the cover is made of plastic. A cover of plastic is particularly weight-saving and easy to manufacture.

In a preferred embodiment, the extension is formed integrally on the cover. The integral formation of the extension with the cover, for example as a single-piece injection-molded part, permits simple manufacture and facilitates subsequent handling.

In a preferred embodiment, the extension is fastened as a separate component to the cover. As a result, the extension can be, optionally, fastened to the cover, so that, for example, a base cover for special markets with more bumpy roads can be expanded by the presence of an extension.

In a preferred embodiment, the projection is made of a light metal. For an extension to be fastened to the cover subsequently, the use of a light metal becomes possible because it is able to withstand external influences even better.

A motor vehicle includes at least one chassis control arm on which a cover according to the invention is arranged. Preferably, these chassis control arms are arranged in pairs on an axle, in particular the rear axle, and formed, for example, as spring links.

BRIEF DESCRIPTION OF THE DRAWING

Further details and advantages of the invention will become apparent from the following description of a preferred exemplary embodiment with reference to the drawings.

It is shown in.

DETAILED DESCRIPTION OF PREFERRED EMBODIMENTS

Figure 1:
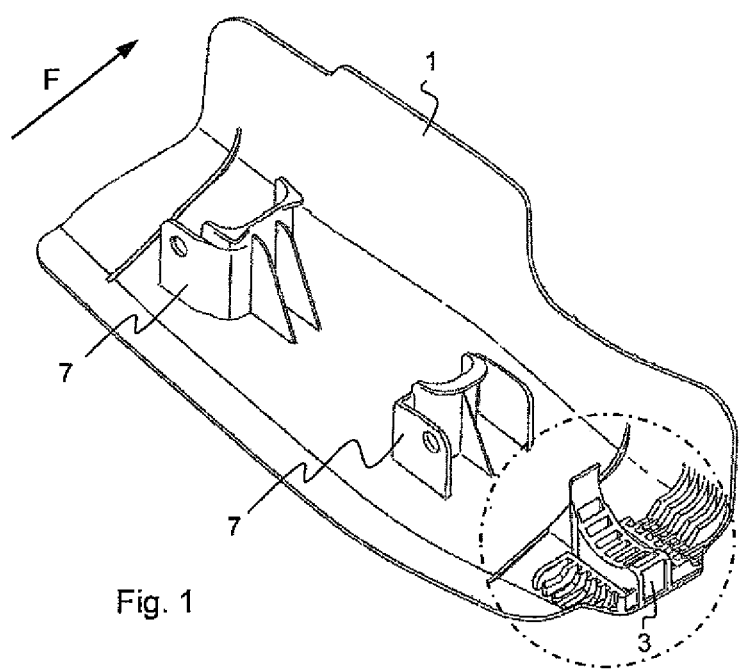
FIG. 1 a cover with a first embodiment of an extension.

According to FIG. 1, the cover 1 is formed as air guiding device from a plastic. The cover 1 is hereby formed in travel direction F with a raised front wall, which also provides protection against impact from rocks. The cover 1 can be attached to the chassis control arm 2, illustrated in FIG. 4, via two fastening portions 7. Provided on the wheel-side outer edge in the installed state is an extension 3 as first embodiment of the invention which is formed integrally with the cover 1. The extension 3 has a toroidal topside which cooperates with the complementary control arm bearing 4 shown in FIG. 4. In addition to the part of the extension 3 that extends far out, provision is made on both sides for grooves 8 into each of which a web of the bearing mount 2a of the chassis control arm 2 fits.

Figure 2:
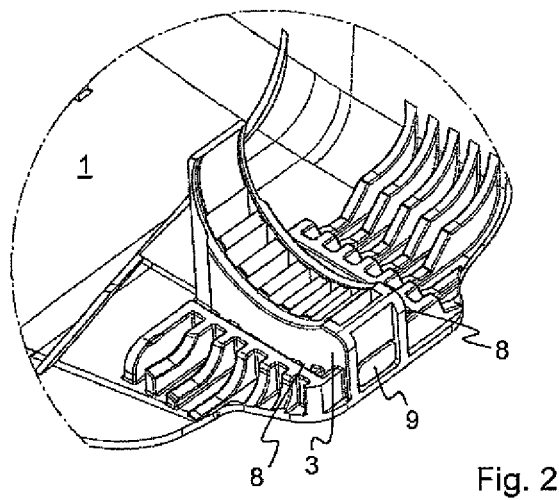
FIG. 2 a detailed view of a second embodiment of the extension.

FIG. 2 shows a second embodiment of the extension 3 in detail. The provision of, i.a., the rib-like structure becomes especially readily apparent here. The second embodiment is characterized by the placement of an insert 9 of a harder material than the remainder of the extension 3, preferably of metal such as aluminum, in a bay of the extension 3. As another alternative, the insert 9 may also be injected into the extension. 3 The insert 9 additionally improves the protective effect of the extension 3 for the bearing mount 2a. Also, this extension 3 has a toroidal topside that cooperates with the complementary control arm bearing 4 shown in FIG. 4. In addition to the part of the extension 3 that extends far out, provision is made on both sides for grooves 8 into each of which one of the bearing mounts 2a of the chassis control arm 2 fits.

Figure 3:
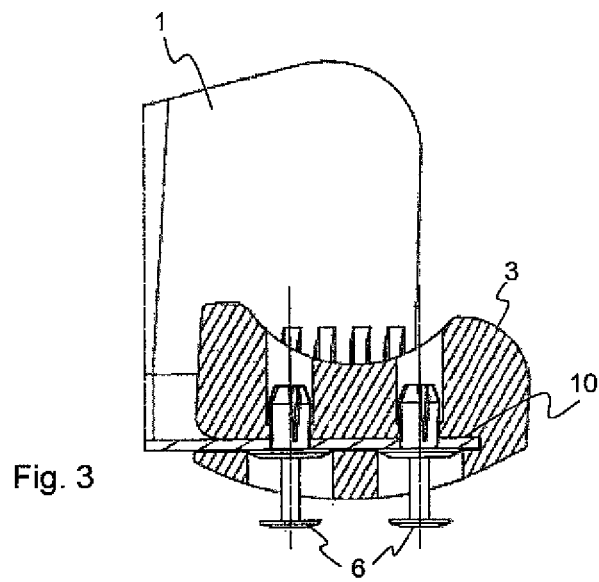
FIG. 3 a side sectional view of a third embodiment of the extension.

FIG. 3 shows a third embodiment of the extension 3, which can be attached as a separate component to the cover 1. For this purpose, the extension 3 includes a mouth 10, which can receive the bottom of the cover 1. Using suitable fasteners 6, the extension 3 is secured to the cover 1.

Figure 4:
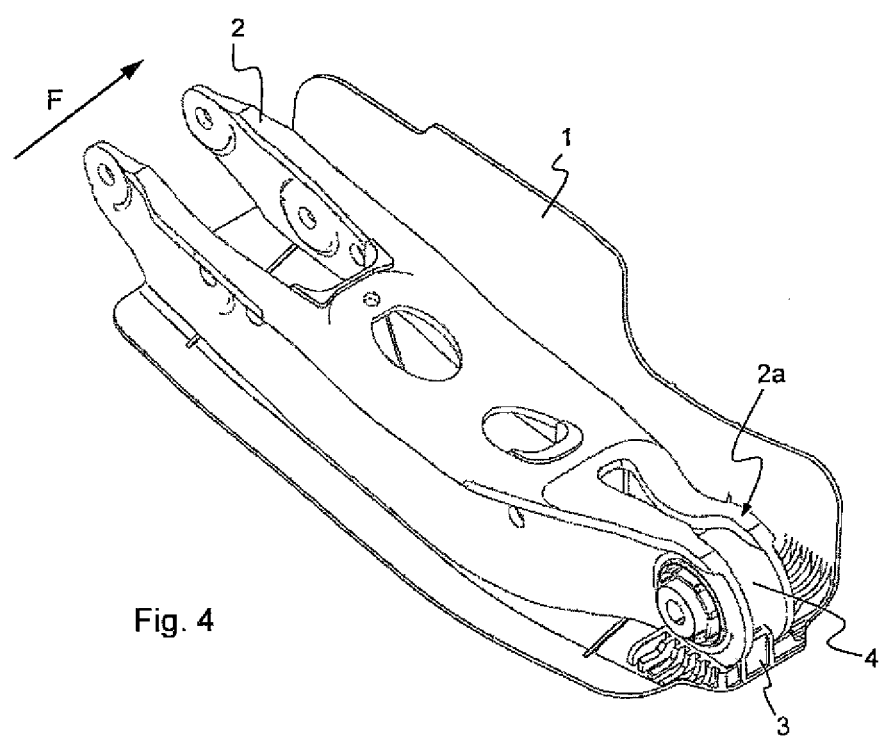
FIG. 4 a chassis control arm with the cover.

FIG. 4 shows a cover 1, which has been connected to a chassis control arm 2 (installation state). The chassis control arm 2 is embodied here as a shaped extruded profile (of aluminum), which has a downwardly open U-shaped profile cross-section. The chassis control arm 2 has on the wheel-side end of its main extension direction a bearing mount 2a which is formed by two parallel webs. The bearing mount 2a has two concentric bores (one in each one of the webs), in which a control arm bearing 4 formed as a rubber-metal sleeve bearing, is placed. The cover 1 covers a major part of the bottom and front side of the chassis control arm 2, with the extension 3 cooperating with the outer sleeve of the control arm bearing 4 as a buffer.

What is claimed is:

1. A cover for a chassis control arm including at least one bearing mount for a control arm bearing, said cover being formed separately from the chassis control arm and covering in an installed state at least part of an underside of the chassis control arm, said cover having arranged thereon an extension to form a buffer, said extension dimensioned to extend from the cover in a direction of the control arm bearing and having a spatial shape which matches an outer contour of the control arm bearing, said extension resting in part upon the control arm bearing.

2. The cover of claim 1, wherein the extension is configured to be deformable in response to an external force.

3. The cover of claim 1, wherein the extension has a rib-like structure.

4. The cover of claim 1, wherein the cover is made of a plastic.

5. The cover of claim 1, wherein the extension is formed integrally on the cover.

6. The cover of claim 1, wherein the extension is secured as a separate component on the cover.

7. The cover of claim 1, wherein the extension is made of a light metal.

8. A motor vehicle, comprising:
at least one chassis control arm including at least one bearing mount for a control arm bearing;
a cover arranged on the at least one chassis control arm and formed separately from the chassis control arm, said cover being configured to cover in an installed state at least part of an underside of the chassis control arm; and
an extension arranged on the cover to form a buffer, said extension dimensioned to extend from the cover in a direction of the control arm bearing and having a spatial shape which matches an outer contour of the control arm bearing, said extension resting in part upon the control arm bearing.

9. The motor vehicle of claim 8, wherein the extension is configured to be deformable in response to an external force.

10. The motor vehicle of claim 8, wherein the extension has a rib-like structure.

11. The motor vehicle of claim 8, wherein the cover is made of a plastic.

12. The motor vehicle of claim 8, wherein the extension is formed integrally on the cover.

13. The motor vehicle of claim 8, wherein the extension is secured as a separate component on the cover.

14. The motor vehicle of claim 8, wherein the extension is made of a light metal.

* * * * *